No. 658,089. Patented Sept. 18, 1900.
R. LAURIN.
NUT LOCK.
(Application filed Sept. 8, 1896.)
(No Model.)

Witnesses
Mark H. Reynolds
Patrick Quinn

Inventor,
Robert Laurin

UNITED STATES PATENT OFFICE.

ROBERT LAURIN, OF CHICAGO, ILLINOIS.

NUT-LOCK.

SPECIFICATION forming part of Letters Patent No. 658,089, dated September 18, 1900.

Application filed September 8, 1896. Serial No. 605,161. (No model.)

*To all whom it may concern:*

Be it known that I, ROBERT LAURIN, a citizen of the United States, residing at Chicago, Cook county, State of Illinois, have invented a new and useful Nut-Lock, of which the following is a specification.

My invention relates to improvements in nut-locks.

The object of the invention is to provide a simple, inexpensive, and efficient means of preventing a nut or bolt from accidental rotation or becoming unscrewed and at the same time provide a nut-lock which can be operated to release the nut or bolt at the will of the operator without destroying or injuring either the nut-lock, bolt, or nut. I accomplish this object by means of the device hereinafter fully described in the accompanying drawings, in which—

Figure 1:
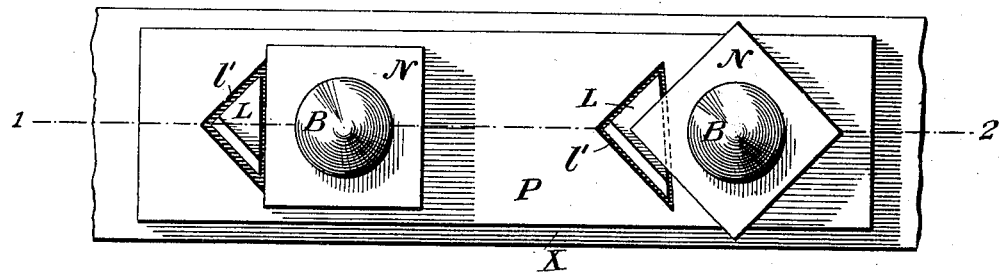
Figure 2:
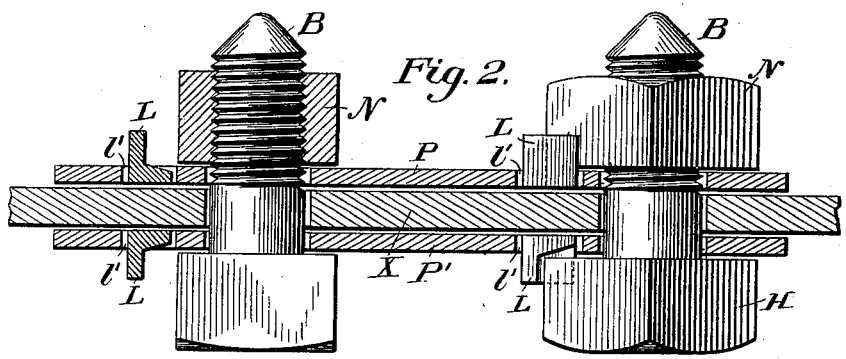
Figure 3:
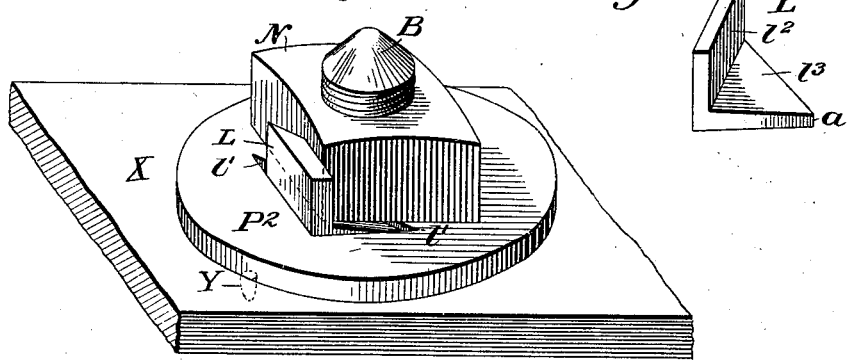
Figure 4:
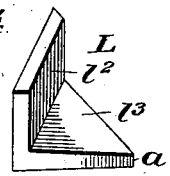

Figure 1 is a plan view of the device as applied to a fish-plate or any place where two or more bolts are used in close proximity to one another. Fig. 2 is a sectional view on the lines 1 2, Fig. 1, partially in perspective. Fig. 3 is a perspective view of the device as applied to a single bolt. Fig. 4 is a perspective view of the catch $l$.

Like letters refer to similar parts throughout the several views.

$b$ represents a bolt, $h$ its head, and $n$ the nut. $x$ represents the web of a rail or any material held between the head and nut of the bolt.

$p$ and $p'$ represent two plates or washers, (made of iron or other metal,) one of which is placed immediately under the head of the bolt and one immediately under the nut, and in the case of a rail-joint the fish-plates may be so designed as to answer the purpose, as will be hereinafter set forth. The plates or washers $p$ and $p'$ are to be so designed as to be kept from revolving or turning around the bolt. This may be accomplished in any practicable manner, as by having the piece continuous and extending over two or more bolts, Figs. 1 and 2, or by any suitable lug or bur $y$, Fig. 3. The plates or washers $p$ and $p'$ have right-angled triangular openings or sockets $l'$, so placed that the right angle or apex of the opening shall be away from the bolt and the long side shall be at right angles to the line of the radius of the bolt, and its center shall be at a distance from the center of the bolt equal to one-half the width of the nut or head of the bolt. Into this socket or opening is placed the catch or locking device $l$, which is a piece of angle-iron or other metal having its foot or base $l^3$, Fig. 4, cut triangular to fit easily into the opening $l'$ and its upright $l^2$, Fig. 4, of a suitable height to catch the head or nut of the bolt.

In describing the operation the word "nut" will be considered as applying to both head and nut.

In operation after the nut is screwed up tight one side of the nut $n$ and head $h$ are brought parallel with the long side of the openings or sockets $l'$ and the catches $l$ are put into their places, when by giving the nut a slight back turn the corners of the nut project over the triangular base $l^3$ and strike against the upright $l^2$, the nut thus holding the catch $l$ in place by projecting over the base $l^3$ and is prevented from further unscrewing by the upright $l^2$. It is self-evident that the nut or bolt will not turn to free the catch $l$ without force, as in so doing it would of necessity screw itself that much the tighter, the upright $l^2$ being placed opposite to one another for head and nut of the same bolt.

In making the socket $l'$ it is not necessary that it extend through the plate $p$, but only so deep as will provide for sufficient thickness of the foot $l^3$, and thus by making fish-plates with suitable sockets the catches $l$ would be the only additional expense to securely lock the bolts and nuts of an ordinary rail-joint. I prefer to make the foot $l^3$ at the point $a$ slightly thinner than at the back to facilitate the turning back of the nut and prevent the nut striking against the foot $l^3$ in turning back against the back or upright $l^2$. Though this is not essential to the device, I mention it for the purpose of setting it forth in my claim.

I am aware that nut-locks have been made having washers or plates with lugs or spurs to prevent them from turning, Fig. 3. I am aware that prior to my invention nut-locks with some likeness to lock Fig. 4 have been made. I therefore do not claim such a combination broadly; but as my invention of the triangular base $l^3$ of lock Fig. 4 and the triangular socket of plate is not a shape or form taken from any other forms, but is a form every corner of four-corner nuts possesses to the line of the radius of the nut on bolt; but What I do claim as new, and desire to secure by Letters Patent, is—

In a nut-lock, the combination of a washer-plate having a triangular-shaped slot therein, of a catch having a base portion fitting said slot and having a flange extending along one side of said base portion, said flange being adapted to engage the side of the nut, substantially in the manner and for the purpose set forth.

ROBERT LAURIN.

Witnesses:
 WILLIS T. GRIFFITH,
 H. BASSETT SHERMAN.